UNITED STATES PATENT OFFICE.

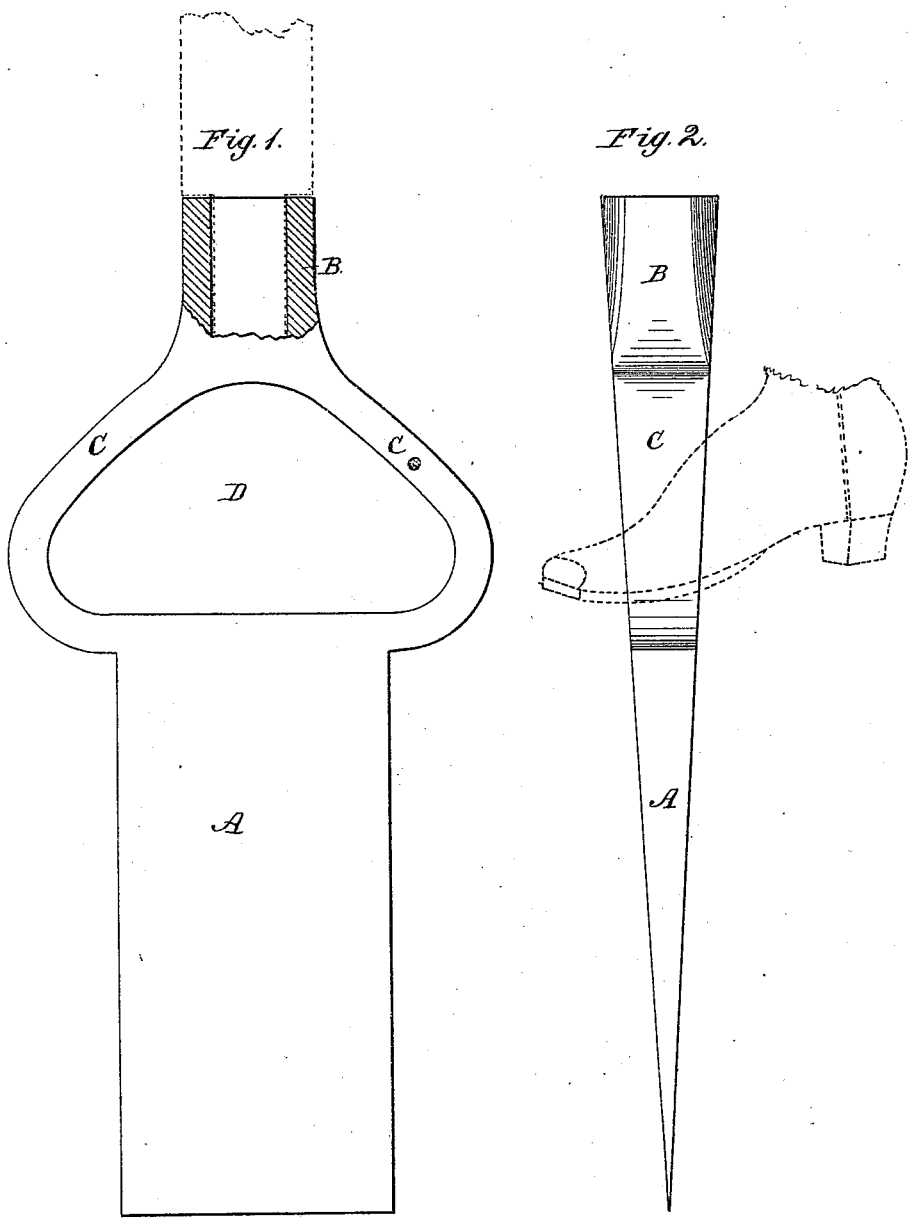

ANDREW KREIDER, OF ANNVILLE, PENNSYLVANIA.

IMPROVEMENT IN PLANT-DIGGERS.

Specification forming part of Letters Patent No. 212,953, dated March 4, 1879; application filed December 30, 1878.

To all whom it may concern:

Be it known that I, ANDREW KREIDER, of Annville, in the county of Lebanon and State of Pennsylvania, have invented a new and Improved Plant-Digger; and I do hereby declare that the following is a full, clear, and exact description of the same.

My invention relates to an improved implement for taking up or removing small trees, and plants, flowers, weeds, &c.

It consists of a blade and handle-socket, connected by bars in such a manner as to form or leave an opening between said blade and socket, in which the foot of the person using the implement may be inserted for the purpose of forcing it into the earth.

In the accompanying drawings, forming part of this specification, Figure 1 is a plan view of the implement, and Fig. 2 an edge view of the same.

In said figures, A indicates the blade; B, the socket for receiving the handle of the implement, and C C the bars or arms which connect them.

The blade A is wedge-shaped, which is the form I prefer, although not necessarily incident to the main feature of my invention. The bars or arms C C diverge from the socket B, and extend downward and join the upper corners of the blade. Thus an opening, D, is left between the socket and blade and arms C, in which the foot of the operator may be inserted when required, for forcing the blade into the earth. The point where the pressure is applied by the foot is thus in the median line of the blade A, instead of being located laterally therefrom, as in other digging implements of this class. Besides the advantage obviously incident to this construction in respect to forcing the blade into the earth, the opening D constitutes a socket from which the foot of the operator cannot be displaced laterally, and he is therefore enabled to do more work with less exertion than with a spade of the usual construction.

What I claim is—

In a plant or weed digger, the blade A and socket B, connected by arms C, forming a foot-rest or stirrup, D, substantially as shown and described.

ANDREW KREIDER.

Witnesses:
GEO. W. STINE,
A. C. RIGLER.